US008092564B2

(12) United States Patent
Totsugi

(10) Patent No.: US 8,092,564 B2
(45) Date of Patent: Jan. 10, 2012

(54) DUST COLLECTION SYSTEM

(75) Inventor: Takahiro Totsugi, Nagoya (JP)

(73) Assignee: Sun Engineering Co., Ltd., Nagoya-Shi, Aichi (JP)

( * ) Notice: Subject to any disclaimer, the term of this patent is extended or adjusted under 35 U.S.C. 154(b) by 463 days.

(21) Appl. No.: 12/297,070

(22) PCT Filed: Apr. 14, 2006

(86) PCT No.: PCT/JP2006/307921
§ 371 (c)(1),
(2), (4) Date: Mar. 3, 2009

(87) PCT Pub. No.: WO2007/122682
PCT Pub. Date: Nov. 1, 2007

(65) Prior Publication Data
US 2010/0011962 A1     Jan. 21, 2010

(51) Int. Cl.
*B01D 51/00* (2006.01)
(52) U.S. Cl. ............... 55/418; 96/399; 96/400; 15/301; 15/310; 15/311
(58) Field of Classification Search ............. 55/418; 96/399–400; 15/161, 301, 310–311
See application file for complete search history.

(56) References Cited

U.S. PATENT DOCUMENTS

| | | |
|---|---|---|
| 3,610,270 A | 10/1971 | Attle |
| 3,786,531 A | 1/1974 | Borg |
| 6,192,715 B1 * | 2/2001 | Orita et al. ................. 65/489 |

FOREIGN PATENT DOCUMENTS

| | | |
|---|---|---|
| AU | 482992 B2 | 5/1977 |
| CA | 742839 A | 9/1966 |
| CA | 893202 A | 2/1972 |
| GB | 2189991 A | 11/1987 |
| JP | 1-129823 | 5/1989 |
| JP | 3-41665 | 4/1991 |

(Continued)

OTHER PUBLICATIONS

European Search Report dated Jun. 22, 2010 issued in corresponding Application No. 06731857.6, 7 pages.

(Continued)

*Primary Examiner* — Jason M Greene
*Assistant Examiner* — Karla Hawkins
(74) *Attorney, Agent, or Firm* — Conley Rose, P.C.

(57) ABSTRACT

An aspect of embodiments of the invention is to lower fluid resistance applied to gas flow (A, S) flowing within a dust collection system (1) so as to enhance dust collection efficiency of the dust collection system (1) without depending on the number or the two dimensional arrangement of movable elements (40) within the system (1). Embodiments of the dust collection system (1) of the invention includes: a housing (10) defining a cavity (50) therewithin, the housing (10) having a plurality of inlets (53) and at least one outlet (57) for gas; a plurality of movable elements (40) for opening and closing the inlets (53), the movable elements (40) being respectively provided corresponding to each of the inlets (53); a gas flow generating device (20) for generating a gas flow (A, S) from each of the inlets (53) to the outlet (57) during the opening operation of the movable elements (40); and a flow path control device (13) for controlling the flow paths of the gas flow (A, S).

10 Claims, 7 Drawing Sheets

FOREIGN PATENT DOCUMENTS

| | | |
|---|---|---|
| JP | 6-52765 | 7/1994 |
| JP | 2001/224548 A | 8/2001 |
| JP | 2002/369785 A | 12/2002 |
| JP | 2001-224548 | 12/2005 |
| JP | 2005-348935 | 12/2005 |

OTHER PUBLICATIONS

Patent Abstracts of Japan, Publication No. 2002-369785 dated Dec. 24, 2002, 1 page.

Patent Abstracts of Japan, Publication No. 2001-224548 dated Aug. 21, 2001, 1 page.

International Search Report for PCT/JP2006/3007921 dated May 16, 2006 (2 pages).

PCT International Search Report and Written Opinion for PCT/JP2006/307921 dated Apr. 14, 2006 (7 pages).

English translation of abstract for JP2005348935 (2 pages), Dec. 22, 2005, Totsugi, Eiko.

English translation of abstract for JP2001224548 (2 pages), Aug. 21, 2001, Totsugi et al.

English translation of abstract of JP1129823 (2 pages), May 23, 1989, Takahshi et al.

* cited by examiner

DUST COLLECTION SYSTEM

CROSS-REFERENCE TO RELATED APPLICATIONS

The present application claims the benefit of priority to PCT/JP2006/307921 filed 14 Apr. 2006, which is hereby incorporated herein by reference in its entirety for all purposes, in its entirety for all purposes.

STATEMENT REGARDING FEDERALLY SPONSORED RESEARCH OR DEVELOPMENT

Not applicable.

TECHNICAL FIELD

The invention relates to a dust collection system. More particularly, the invention relates to a system for collecting dust from persons or vehicles by using gas flow generated by a gas flow generating device.

BACKGROUND ART

Conventionally, in facilities such as factories, hospitals or grocery stores, there has been a need for removing dust or dirt adhering to persons entering into or vehicles carried into the facilities. Further, there has recently been a need for removing dust or dirt adhering to person's shoes or cart's wheels not only in facilities such as factories but also in common buildings or rather common houses, because computers or electronic devices, which are negatively affected by dust, have become popular.

In order to satisfy the aforementioned need, Japanese Laid-Open Patent Publication No. 8-322782, for example, discloses a dust removal mat in which dust is removed by applying a suction force of a dust collector or an electric vacuum cleaner.

Such a dust removal mat is provided with a wiping surface, which includes multiple slits, for wiping dust or dirt out of pedestrian's shoe soles. Also, air passages defined with multiple supporting columns are formed below the wiping surface. When a pedestrian applies his or her weight onto the wiping surface, the slits are resiliently deformed and opened so as to serve as suction openings. Thus, dust or dirt adhering to the shoe soles is drawn through the suction openings, and then collected by the dust collector or the electric vacuum cleaner through the air passages below the wiping surface.

Japanese Laid-Open Patent Publication No. 2001-224548 discloses another dust collection system, in which a movable element, which is provided with a brush on its top surface and resiliently biased upward, scratches off dust or dirt on the shoe soles of the pedestrian, while the movable element is, due to the pedestrian's weight, displaced downward so as to define a suction opening, through which the dust or dirt is drawn by a dust collector.

In the aforementioned configuration, air introduced from the suction opening of the dust collection system takes a flow path, which passes through the vicinity of plurally-provided supporting columns or movable elements and then reaches the dust collector.

Accordingly, the air flowing along the flow path is subjected to fluid resistance imposed by the multiple supporting columns or movable elements such that the dust collection efficiency of the dust collector is decreased.

Especially, with respect to the dust collection system of Japanese Laid-Open Patent Publication No. 2001-224548, the number of movable elements needs to be increased to ensure that an effective area for dust collection be greater, while the increase in the number of the movable elements causes fluid resistance to be significantly increased within the main body of the dust collection system. Therefore, the number of the movable elements needs to be limited to a certain number in order to ensure a dust collection efficiency for practical use. Further, in order to reduce the fluid resistance caused by the movable elements as much as possible, the two dimensional arrangement of the movable elements needs to be devised such that the fluid resistance applied to gas flow is optimized.

Patent Document 1: Japanese Laid-Open Patent Publication No. 8-322782

Patent Document 2: Japanese Laid-Open Patent Publication No. 2001-224548

DISCLOSURE OF INVENTION

Problem to Be Solved by Invention

Thus, there is a need in the art for a device to lower fluid resistance applied to a gas flow moving within the dust collection system so as to enhance dust collection efficiency of the dust collection system without depending on the number or the two dimensional arrangement of the movable elements within the system.

Means for Solving Problem

In order to achieve the aforementioned object, an embodiment of a dust collection system of the invention includes: a housing defining a cavity therewithin, the housing having a plurality of inlets and at least one outlet for gas; a plurality of movable elements for opening and closing the inlets, the movable elements being respectively provided corresponding to each of the inlets; a gas flow generating device for generating a gas flow from each of the inlets to the outlet during the opening operation of the movable elements; and a flow path control device for controlling the flow paths of the gas flow. The gas flow generating device generating gas flows by introducing the gas outside of the housing from each of the inlets, and each of the gas flows is controlled by the flow path control device so as to avoid interference from the adjacent movable elements.

According to the aforementioned dust collection system, the gas flows introduced from the outside of the housing are controlled by the flow path control device such that the gas flows flow within the housing while avoiding interference from movable elements that may cause fluid resistance for the gas flows. Thus, it is possible to lower the fluid resistance applied to the gas flows within the housing.

It should be noted that the "gas" and the "gas flow(s)" herein are referred to as gas and its flow(s) occurring in the atmosphere where the present invention is used. Thus, the "gas" may be referred to as air when in a common indoor or outdoor environment. Accordingly, for explanation purpose, the "gas" is referred to as air herein. However, under particular circumstances, the "gas" may include artificial air in which oxygen and nitrogen are stably mixed, and oxygen-enriched air. Further, the "gas" may include gas providing a particular atmosphere such as carbon dioxide and nitrogen used for grain storage, other than a general air composition.

Also, the "dust" may include but not limited to soil, dirt, sand and dust that adhere to a shoe sole or clothes of a person, or a vehicle such as a cart, bicycle and a forklift. Thus, the "dust" may for example include dirt mixed with rain or snow, or dust mixed with water or ice.

In one embodiment, each of the gas flows that are introduced from each of the housing inlets flows so as to avoid interference from the adjacent movable elements such that the gas flows are merged by the flow path control device into at least one flow path and then introduced into at least one housing outlet. According to this embodiment, each of the gas flows introduced from each of the inlets can be merged into at least one gas flow while the fluid resistance imposed by the movable elements are reduced within the housing provided with a plurality of inlets and movable elements.

Preferably, the flow path control device may include a partition wall for separating the cavity within the housing into a first cavity in which the movable elements are disposed, and a second cavity having the outlet. This partition wall may include a plurality of communicating holes for communicating the first cavity with the second cavity. Each gas flow flowing within the first cavity is controlled so as to be introduced into the second cavity according to the positioning of the communicating holes. According to this embodiment, the gas flow flowing within the second cavity may not be substantially interfered with the movable elements disposed within the first cavity, because the cavity within the housing is separated by the partition wall. Thus, even if there are a plurality of movable elements provided within the housing, it is possible to minimize fluid resistance applied to each of the gas flows within the first cavity, no matter how the two dimensional arrangement of the movable elements are.

Preferably, the first and the second cavities within the housing are respectively provided in layer such that the second cavity is provided underlying with respect to the first cavity. According to this embodiment, it is possible to minimize the flow path length passing through the first cavity in which fluid resistance exists, because the gas flow can be introduced into the second cavity from directly below the first cavity. Thus, it is possible to limit the flow path length to a level substantially equivalent to the thickness of the first cavity.

Preferably, the movable elements disposed within the first cavity are configured to open some of the plurality of inlets, which are located in an area corresponding to a dust-collected subject passing over the housing. Also, the gas flow generating device is configured to introduce the gas outside of the housing via the opened inlets. According to this embodiment, it is possible to direct the suction power of the gas flow generating device only to the dust-collected subject, because the gas outside of the housing does not enter into the housing from inlets other than in the area corresponding to a dust-collected subject passing over the housing.

It should be noted that the "dust-collected subject" herein is referred to as a whole or a part of a subject such as a person, a vehicle and the like, to which dust adheres that is to be collected by the dust collection system of the present invention. The dust-collected subject may usually include, but not limited to, a pedestrian or a vehicle passing by. For example, it may be a person or a vehicle temporarily staying on the dust collection system of the present invention.

Preferably, the housing further includes a top wall having the plurality of inlets. Also, the top wall is configured to hold the partition wall in suspension. The partition wall separates the cavity within the housing into the first and the second cavities. According to this embodiment, it is possible to house the inner structural materials for supporting the partition wall into the first cavity above the partition wall. Thus, it is possible to eliminate the inner structural materials for supporting the partition wall within the second cavity below the partition wall. Therefore, the number of the inner structural materials for maintaining structural strength of the whole housing is minimized within the second cavity such that fluid resistance can be minimized.

Preferably, the top wall of the housing is provided with a heating member. According to this embodiment, even if dust adhering to the dust-collected subject is solidified with snow or ice, it is possible to melt the snow or ice and collect the dust as water-mixed dust.

Preferably, the heating member is disposed on the undersurface of the top wall of the housing so as to be configured to heat the top wall. According to this embodiment, the heating member may not be contaminated by the dust of the dust-collected subject or worn out by coming into contact with the dust-collected subject, because the heating member does not directly contact with the dust-collected subject.

In another embodiment, the dust collection system of the present invention may further include a suction pressure sensor. The gas flow generating device is controlled based on an output signal from the suction pressure sensor such that pressure of gas introduced into the housing is maintained at a predetermined pressure.

For example, the number of the inlets may be increased for introducing gas from the top wall of the housing when the dust-collected subject corresponds to a broader area. In this case, the amount of gas introduced into the housing is significantly increased such that suction pressure may be reduced. However, according to this embodiment, such a pressure reduction within the housing may be sensed by the suction pressure sensor such that the pressure reduction can be compensated.

In yet another embodiment, the dust collection system of the present invention may further include an area sensor for sensing an approach of the dust-collected subject. The gas flow generating device is operably controlled according to a signal from the area sensor. According to this embodiment, it is possible to operate the gas flow generating device only when the dust-collected subject is close to the dust collection system.

In still another embodiment, the dust collection system of the present invention includes: a housing defining a cavity therewithin, the housing having a plurality of inlets and at least one outlet for gas; a plurality of movable elements for opening and closing the inlets, the movable elements being respectively provided corresponding to each of the inlets; a partition wall separating the cavity within the housing into a first cavity in which the movable elements are disposed, and a second cavity having the outlet, the partition wall further including a plurality of communicating holes for communicating the first cavity with the second cavity; and a gas flow generating device for generating a gas flow from each of the inlets to the outlet during the opening operation of the movable elements. The movable element is configured to open one of the plurality of inlets, which is disposed within an area corresponding to a dust-collected subject passing over the housing. The gas flow generated by the gas flow generating device flows in a order of the opened inlet, the first cavity, the communicating hole, the second cavity and the outlet so as to be exhausted out of the housing.

According to this embodiment, the gas flow introduced into the housing from the inlet within the area corresponding to the dust-collected subject can flow in the second cavity other than the first cavity including the movable elements causing fluid resistance existing within the housing. Thus, even if there are a plurality of movable elements provided within the housing, it is possible to minimize fluid resistance applied to each of the gas flows within the first cavity, no matter how the two dimensional arrangement of the movable elements are.

Other characteristics of the invention will be shown more clearly from the following description according to an embodiment shown in the attached drawings, which is to be understood in an illustrative but not limiting way.

Figure 1:
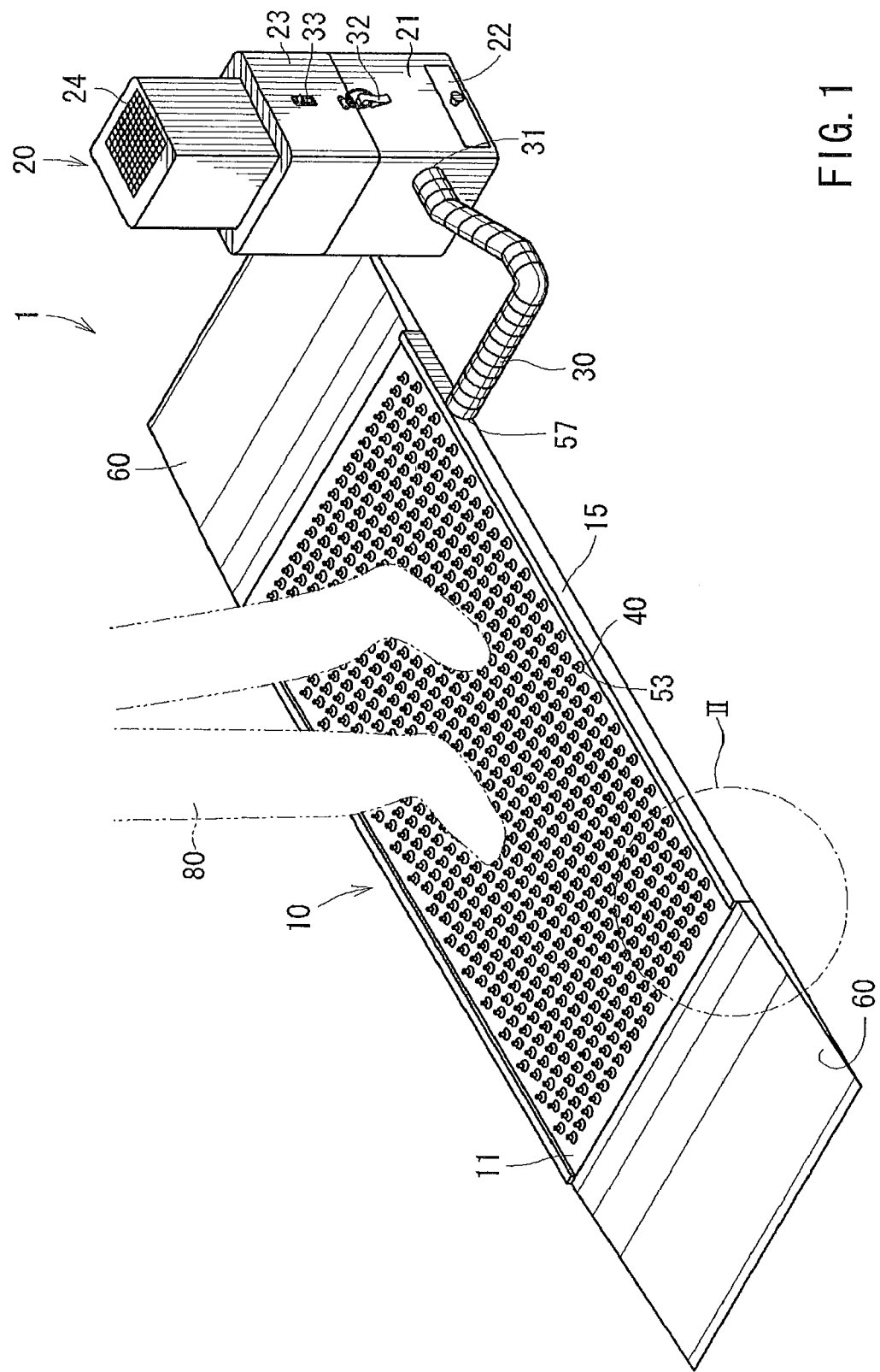
FIG. 1 is a perspective view schematically showing a first embodiment of the invention.

EXPLANATIONS OF LETTERS OR NUMERALS 1, 101 dust collection system
10, 110, 210 housing
11 top wall
13 partition wall
18 heater
20 gas flow generating unit
30 suction tube
40, 240 movable element
50, 250 inside cavity
54 communicating hole
56, 256 supporting member
A gas flow
L load

BEST MODE FOR CARRYING OUT THE INVENTION

Referring now to the attached drawings, exemplary embodiments are described below.

First Embodiment

A first embodiment is shown in FIGS. 1 to 4. As shown in FIG. 1, a dust collection system 1 of the embodiment generally includes a housing 10 and a gas flow generating unit 20. The housing 10 has a substantially rectangular, hollow plate shape. The housing 10 is also constructed to allow a person 80 (shown in phantom) to be supported on the housing 10. The housing 10 is made of a material, which is determined in view of its use environment, such as a load of the person 80 supported thereon, weather impact and the like. For example, the housing 10 may be made of a conventional resin or metal material, and is preferably made of stainless steel. It should be noted that the person 80 is shown as an object passing over the housing 10 in FIG. 1 for explanation purpose. This object is not limited to a person but may include a vehicle (not shown) such as a cart and the like.

The housing 10 has a plate shaped top wall 11 forming the upper face thereof. The upper wall 11 is provided with a plurality of gas flow inlet 53 respectively formed in a substantially circular shape. Each of the gas flow inlets 53 is provided with a corresponding movable element 40. The movable element 40 is configured to move downward when a load of the person 80 is applied onto the upper portion of the movable elements 40. Thus, a gap is provided between the movable elements 40 and the periphery of the gas flow inlet 53 so that the gas flow inlet is opened. Detailed structures of the movable element 40 will be described later referring to FIGS. 2 to 4.

Also, both longitudinal ends of the housing 10 are respectively provided with a slope 60. The slope 60 is configured for the person 80 to easily pass over the housing 10 without interfering with the ends of the housing 10. Preferably, the slope 60 may be configured to be removable during the setup or the maintenance of the housing 10, while configured not to be easily displaced by the person 80 passing over. Specifically, the slope 60 is made by forming a metal plate such as a checker plate, which is provided with antislip asperities on the surface, to be folded into a slope shape, or by forming rubber, elastomer, or wood into a slope shape.

The gas flow generating unit 20 is provided with a dust collector 21 and a gas flow generator 23. The dust collector 21 and the gas flow generator 23 are sealingly connected with each other by a fastener 32 such that the unit 20 can be separated during the maintenance. The gas flow generator 23 uses a conventional motor and a fan (not shown) so as to generate negative pressure. The motor is preferably an electric motor controlled to be on/off by a power switch 33. The gas flow generated by the negative pressure goes through a suction tube 30 so as to be introduced into the dust collector 21 via a suction opening 31 opened onto the unit 20. Then, relatively large dust included in the gas flow is deposited in a dust tray 22 located in the lower portion of the unit 20. Further, relatively small dust is removed by filtration of the gas flow through a certain filter (not shown). The filtered air goes through the gas flow generator 23 and then exhaust opening 24 provided in the upper portion of the unit 20. It should be noted that the suction tube 30 is a flexible tube made of a predetermined material so as to be strong enough to hold a gas flow under negative pressure or suction pressure generated by the unit 20. Also, the filter can handle water and moisture-contained dust such that the unit 20 is operable even if these are drawn in.

Therefore, air in the external atmosphere goes through a plurality of gas flow inlets 53 provided in the top wall 11 of the housing 10, the inside of the housing 10, a single gas flow outlet 57 provided in a side wall 15 of the housing 10, the suction tube 30, and the suction opening 31, so as to be drawn into the gas flow generating unit 20. The gas flow drawn into the gas flow generating unit 20 is exhausted into the external atmosphere from the exhaust opening 24 provided in the upper portion of the unit 20.

Figure 2:
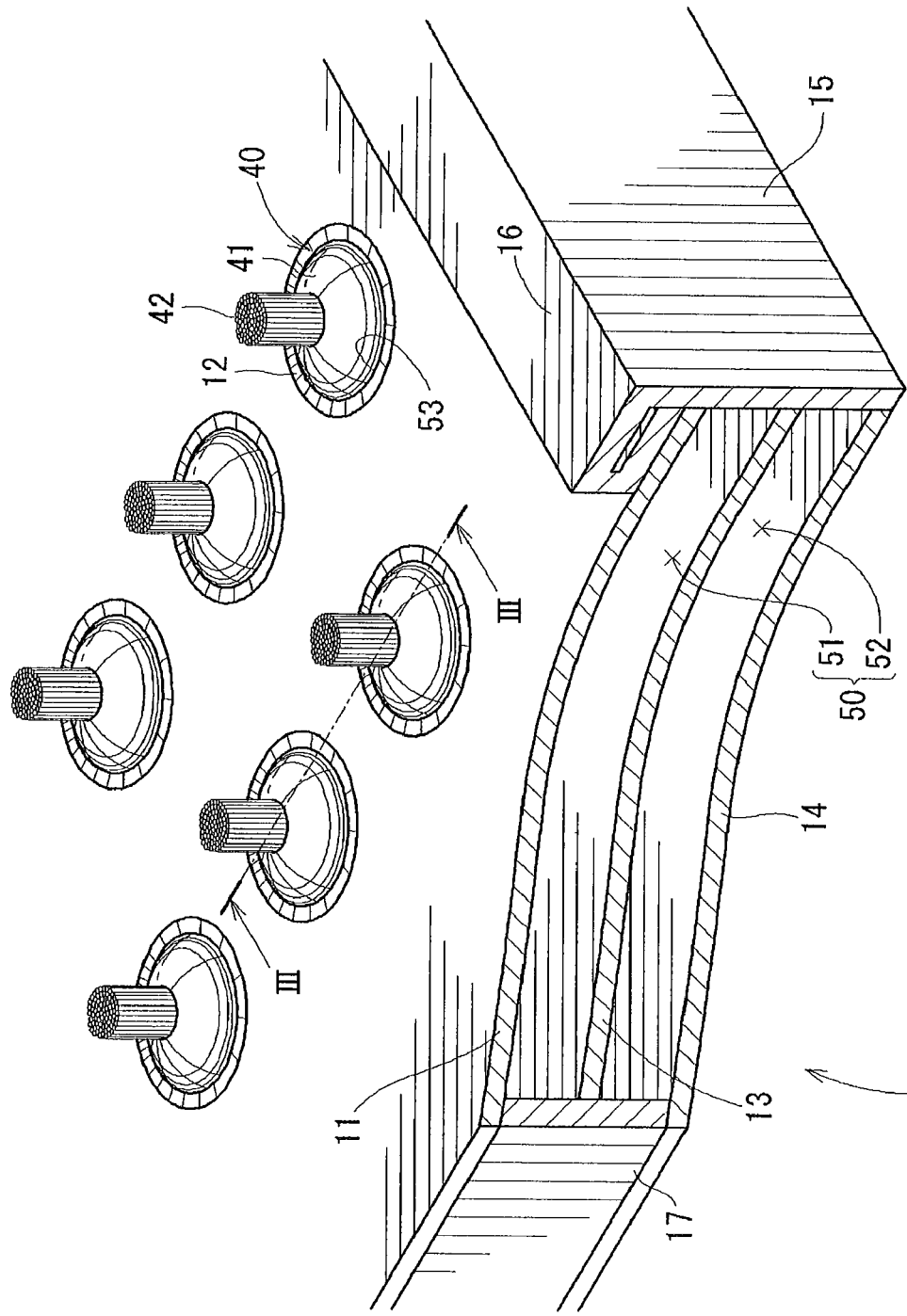
FIG. 2 is a perspective, partially broken away view of the area shown as II in FIG. 1.

FIG. 2 shows further detailed structures of the housing 10. The overall profile of the housing 10 is a box shape defined by the top wall 11, a bottom wall 14, sidewalls 15 opposite to each other, and end caps 17 opposite to each other. Preferably, as shown in FIG. 2, a single rectangular-shaped metal plate is folded and formed into the bottom wall 14 and the side walls 15, while the transverse direction ends of the side walls 15 are further folded and formed into a top wall retaining portion 16. A predetermined method of securement, such as screws, allows the transverse direction ends of the top wall 11 to be retained by the top wall retaining portion 16 so as to be secured to both of the side walls 15. The top wall 11, the bottom wall 14, and the sidewalls 15 define the longitudinal ends, the cross section of which is a substantially rectangular cylindrical shape. Both of the longitudinal ends are plugged by the end caps 17 with a predetermined method of securement such as welding or screws. Thus, the profile of the housing 10 is formed.

It should be noted that an inadvertent gap in somewhere other than the gas flow inlets 53 in the housing 10 can affect the ability to maintain negative pressure. Accordingly, predetermined sealing members (not shown) made of rubber or elastomer are used at setup portions for the top wall 11, the bottom wall 14, the side walls 15, and the end caps 17. Further, although only the end cap 17 is shown in FIG. 2 as a member supporting the top wall 11, disposed between the bottom wall 14 and the top wall 11, another reinforcing structure may be provided such as a beam member between the bottom wall 14 and the top wall 11 in order to advantageously support the load applied onto the top wall 11 by the person 80.

As shown in FIG. 2, an inside cavity 50 of the housing 10 is separated in up and down directions by a partition wall 13: a first cavity 51 is defined in an upper layer, while a second cavity 52 in the lower layer. The partition wall 13 has a predetermined thickness so as to be in a substantially plate shape. Preferably, the partition wall 13 is made of a metal material such as stainless steel, similar to the top wall 11, the bottom wall 14, and the sidewalls 15 forming the profile of the housing 10. Thus, it is possible to make the partition wall 13 rigid enough to provide a supporting structure such as supporting columns (not shown) between the bottom wall 14 and the partition wall 13.

Figure 3:
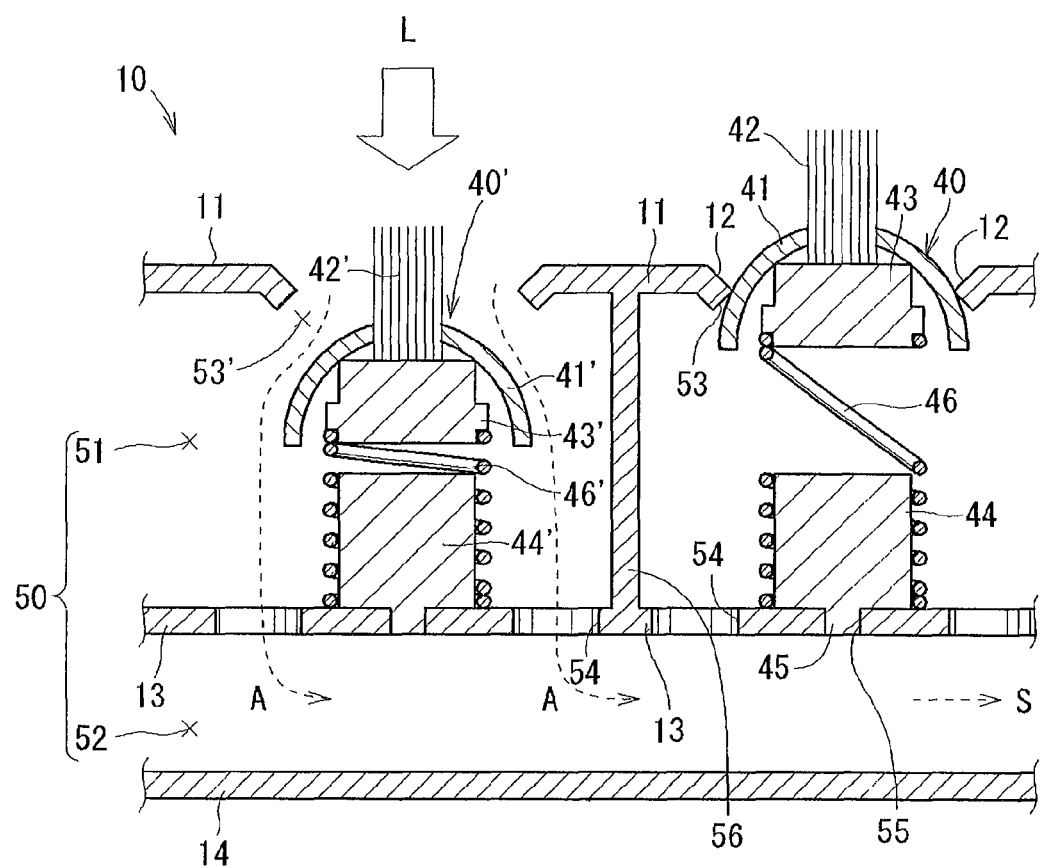
FIG. 3 is a sectional view taken along line III-III in FIG. 2.
Figure 4:
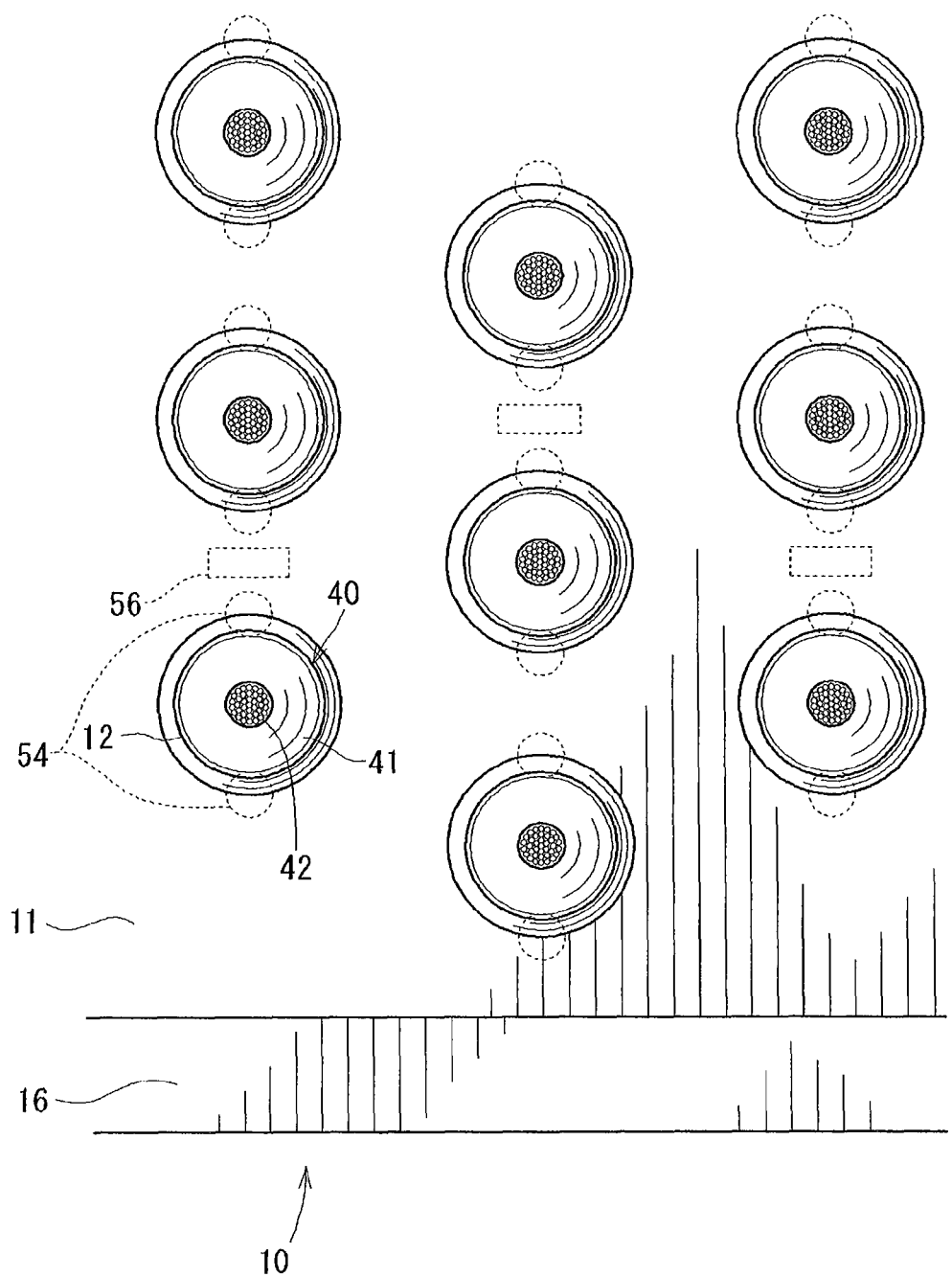
FIG. 4 is a plan view of a housing according to the first embodiment of the invention.

Referring now to FIGS. 2 to 4, the structure of the partition wall 13 will be described. FIG. 3 shows the side sectional view of the partition wall 13 shown in FIG. 2. The partition wall 13 is provided with a plurality of communicating holes 54 that permits the first cavity 51 of the upper layer to communicate with the second cavity 52 of the lower layer. Also, FIG. 4 shows the two-dimensional arrangement of the plurality of communicating holes 54. As best shown in FIGS. 3 and 4, each of the communicating holes 54 is provided substantially directly below a recess 12, which forms the periphery of the gas flow inlet 53 of the top wall 11.

FIGS. 3 and 4 also show a supporting member 56 connected between the top wall 11 and the partition wall 13. The supporting member 56 is formed in a substantially rectangular column shape so as to be arranged between nearby communicating holes 54. Further, as shown in FIG. 3, the upper end of the supporting member 56 is secured to the top wall 11, while the lower end of the supporting member 56 is secured to the partition wall 13 with welding, screws and the like such that the top wall 11 supports the partition wall 13 in suspension by way of the supporting members 56. The number and the two dimensional arrangement of the supporting members 56 can be determined depending on a load supported in suspension, i.e., the weight of the partition wall 13 and the movable elements 40, and the general size and shape of the housing 10. It should be noted that the shape of the supporting member 56 is not limited to the rectangular column shape as shown in FIG. 4, but may include another shape such as a cylindrical shape.

Referring now to FIGS. 2 to 4, the structure of the movable elements 40 will be described. FIG. 2 shows the movable elements 40, which are respectively disposed at the gas flow inlet 53 formed on the top wall 11. In this condition, a sealing dome 41 located in the upper portion of the movable element 40 seals the gas flow inlet 53 such that a gas flow flowing into the inside cavity 50 of the housing 10 from the gas flow inlet 53 is substantially avoided even if the gas flow generating unit 20 shown in FIG. 1 is in operation.

The upper portion of the sealing dome 41 is provided with a brush 42, which facilitates taking out dirt and dust adhered to a shoe sole of the person 80. Also, the recess 12 is provided around the gas flow inlet 53 of the top wall 11. The recess 12 is provided inclined downwardly from the outer periphery to the inner periphery. Thus, dirt and dust taken out by the brush 42 from the shoe sole of the person 80 fall down into the recess 12 so as to be easily introduced into the inside cavity 50 along with the air flowing thereinto from the gas flow inlet 53. It should be noted that the length of the brush 42 may be adjusted depending on the use. For example, it may be adjusted depending on a groove depth or shape of a shoe sole surface of the person 80 or a wheel surface of the vehicle. Also, it may be adjusted depending on dust types.

FIG. 3 shows the movable elements 40 and 40' that respectively allow the corresponding gas flow inlet 53 provided on the top wall 11 to be in a closed state and in an opened state. It should be noted that the numerals for components regarding an opened state are dashed in order to distinguish the opened state from the closed state in FIG. 3, although the same components in FIGS. 1 and 2 are referred to as the same numerals also in FIG. 3.

The movable element 40 generally includes a head 43 and a base 44. Both of the head 43 and the base 44 are made of a material such as resin or the like so as to be in a substantially cylindrical shape. The head 43 is mechanically connected with the base 44 by a resilient member 46 such as a spring. The undersurface of the base 44 is provided with a boss 45, which engages into and is secured with a securing hole 55 provided on the partition wall 13. In order to ensure the securement, for example, the boss 45 may be adhesively secured with the securing hole 55, or the base 44 may be secured with the partition wall 13 by using a screw (not shown), which is threaded from behind the partition wall 13 into the base 44. On the other hand, the head 43 is biased by the resilient member upward or toward the top wall 11. The head 43 is displaceable due to action of the resilient member 46, in up and down directions, as well as in radial directions, with respect to the central axis thereof.

The top surface of the head 43 of the movable element 40 is implanted with the brush 42 such as a nylon brush. Also, the sealing dome 41, which is formed in a substantially hemispherical shape, is provided to surround the head 43 and the root portion of the brush 42. The sealing dome 41 is secured with the head 43 by a securing member such as an adhesive. Or, the sealing dome 41 may be formed integrally with the head 43. It should be noted that the brush 42 may be implanted on the top surface of the sealing dome 41.

The right side of FIG. 3 shows a longitudinal sectional view of the movable element 40 without a load L applied onto the brush 42. The sealing dome 41 sealingly contact with the periphery of the gas flow inlet 53 provided on the top wall 11, because the head 43 is biased upward by the resilient member 46. In order to ensure the sealability, the sealing dome 41 is made of a material such as resin or rubber. This sealability ensures the sealing of the gas flow inlet 53. Thus, it is possible to concentrate the suction force of the gas flow generating unit 20 on the gas flow inlet 53, which corresponds to the movable element 40 in an opened state due to the applied load L.

It should be noted that, in order to ensure the sealing of the gas flow inlet 53, the sealing dome 41 is preferably formed in a substantially hemispherical shape, while the gas flow inlet 53 is formed in a circular shape corresponding to the shape of the sealing dome 41. According to the structures, the sealing dome 41 can substantially equally abut on the whole periphery of the gas flow inlet 53 even if the sealing dome 41 become out of position along the outer periphery of the hemispherical shape. However, it is not limited to the aforementioned shape as long as the sealing dome 41 can sealingly contact with the gas flow inlet 53 when the movable element 40 is in a closed state.

The left side of FIG. 3 shows the movable element 40' in a state where the load L is applied onto the brush 42' or an opened state. When the person 80 gets on the brush 42', for example, the load L is applied onto the head 43' in a direction against the biasing force of the resilient member 46 or a downward direction such that the head 43' is downwardly displaced and becomes opened. Accordingly, a gap 53' or a gas flow inlet is formed between the inner periphery of the recess 12 provided on the top wall 11 and the sealing dome 41'.

It should be noted that FIG. 3 shows the direction of the load L as a vertically downward arrow for explanation purpose, although it is not limited to the vertically downward direction. For example, the load L may be directed obliquely downward with an inclination angle. Especially when a wheel of the vehicle passes over, the wheel approaches laterally to the brush 42' such that the load L may be more likely to be directed obliquely downward. Also, when the height of the brush 42' is configured to be relatively higher, it is highly possible for the load L to be directed obliquely downward. When the load L is directed obliquely downward, the distance between the inner periphery of the recess 12 and the sealing dome 41 may become radially uneven with respect to the central axis of the movable element 40', although the gap 53' is maintained. Thus, even if the operation of the dust collection system 1 of the first embodiment direct the load L obliquely downward, the dust collection efficiency of the dust collection system 1 may not be affected.

Further, no air outside may be introduced into the housing 10 and the unit 20 in case all the movable elements 40 are completely closed, or when load L does not exist all over the housing 10. If the gas flow generating unit 20 is in operation in this condition, the motor of the gas flow generating unit 20 may be overloaded due to an excess negative pressure generated within the inside cavity 50. However, even if such excess negative pressure is applied to the inside of the housing 10 of the first embodiment, the negative pressure can downwardly displace any number of movable elements 40 against the biasing force of the resilient members 46. Therefore, not all the movable elements 40 can be in a completely closed state, even if no load L is applied to all the movable elements 40 when the gas flow generating unit 20 is in operation. It should be noted that, in order to ensure an entry of the air outside if there is no load L exists all over the housing 10, it is possible to use a vent (not shown) in either the housing 10 or the unit 20, which is operated when a predetermined negative pressure is applied, other than to use the automatic displacement of the resilient member 46 of the movable element 40.

Referring now to FIG. 3, the gas flow flowing in the inside cavity 50 of the housing 10 will be described. As described above, the inside cavity 50 of the housing 10, i.e., the first cavity 51 and the second cavity 52, is maintained in negative pressure by the gas flow generating unit 20. Thus, the air outside including dirt or dust taken off by the brush 42' enters into the first cavity 51 from the gap 53' that is formed between the inner periphery of the recess 12 on the top wall 11 and the sealing dome 41'. The partition wall 13, which separates the first cavity 51 from the second cavity 52, is provided with a plurality of communicating holes 54 such that a gas flow A, flowing in a direction shown by a dotted arrow in FIG. 3, is generated corresponding to each of the communicating holes 54 near the gap 53'. After drawn into the first cavity 51, the gas flow A pass through the communicating hole 54 and then enters into the second cavity 52. At this point, the gas flow A passes along a distance substantially equivalent to the thickness of the first cavity in up and down directions, and then are introduced into the second cavity 52, because each of the communicating holes 54 is provided substantially directly below the corresponding gap 53'. Thus, the gas flow A is not disturbed by the base 44' and the resilient member 46' of the movable element 40' or the supporting member 56.

After introduced into the second cavity 52, each of the gas flows A is merged into a suction flow S in the second cavity 52 so as to be introduced into a suction tube 30 fluidly connected to the second cavity 52 via the gas flow outlet 57 shown in FIG. 1. Then, it is drawn into the gas flow generating unit 20. It should be noted that the gas flow outlet 57 is preferably configured to be provided only in the second cavity 52. However, there is a case where the thickness or the height of the housing 10 is made small but the diameter of the suction tube 30 cannot be so minimized, because a certain amount of the flow is to be ensured. In this case, the suction tube 30 may be connected to the second cavity 52 in such a manner that the suction tube 30 overlaps with the first cavity 51. Further, the position at which the gas flow outlet 57 is provided is not limited to the position shown in FIG. 1. For example, it may be provided at a longitudinal end of the housing 10. In addition, a single housing 10 may be provided with two or more gas flow outlets 57, each of which is fluidly connected with the gas flow generating unit 20. In this case, there may be two or more flow paths provided between the housing 10 and the gas flow generating unit 20.

Figure 8:
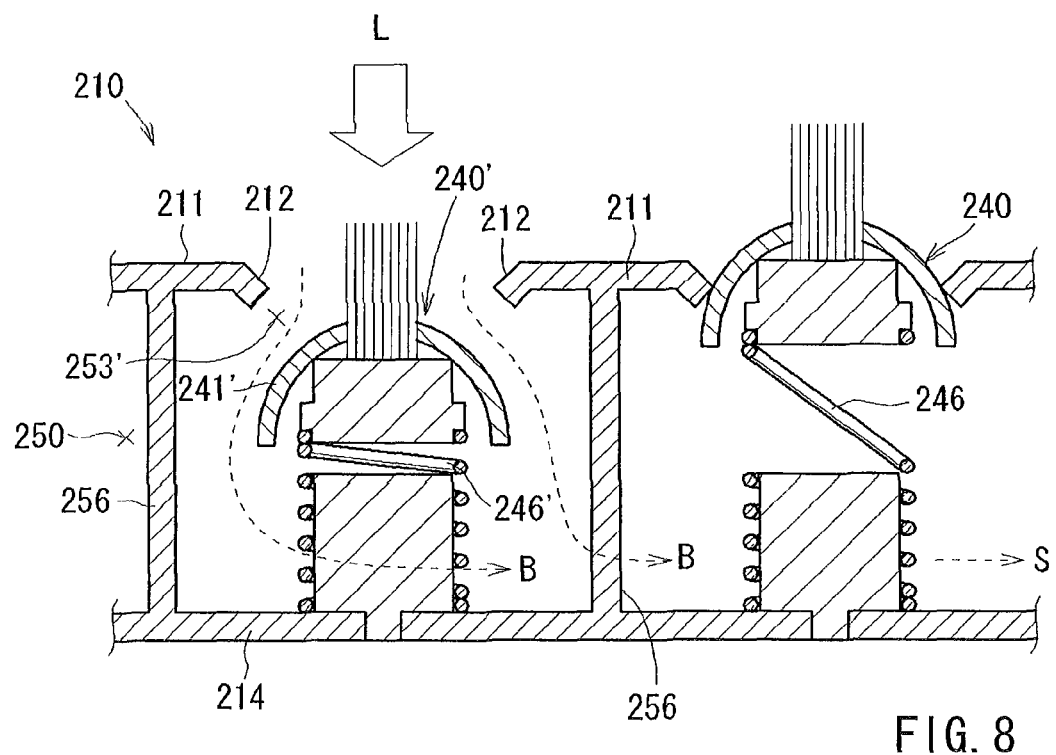
FIG. 8 is a sectional view similar to FIG. 3, showing a known device.

Referring now to FIG. 8, a gas flow flowing within a conventional housing 210 will be described for a comparison purpose. In FIG. 8, 200 is added respectively to the reference numerals shown in FIG. 3 corresponding to the first embodiment in order to show differences from the first embodiment.

Different from the housing 10 of the first embodiment, the first cavity 51 and the second cavity 52 are not defined in a conventional housing 210. However, an inside cavity 250 within the housing 210 may be regarded as equivalent to the first cavity 51 of the housing 10 of the first embodiment in that movable elements 240, 240' and supporting members 256 are housed therein. In the conventional housing 210, a gas flow B introduced from a gap 253' is merged into a suction flow S in the inside cavity 250. At this point, the movable elements 240, 240' and the supporting members 256 interrupt the flow paths of the gas flows B and S so as to act as fluid resistance. Thus, the suction efficiency for the gas flow generating unit 20 drawing the gas flows B and S is lowered. Worse than this, the gas flows B and S including dust pass through the inside cavity 250 such that the dust may adhere to movable portions of the movable elements 240, 240' such as resilient members 246, 246'. Thus, the moving performance of the movable elements 240, 240' may be lowered.

Second Embodiment

Figure 5:
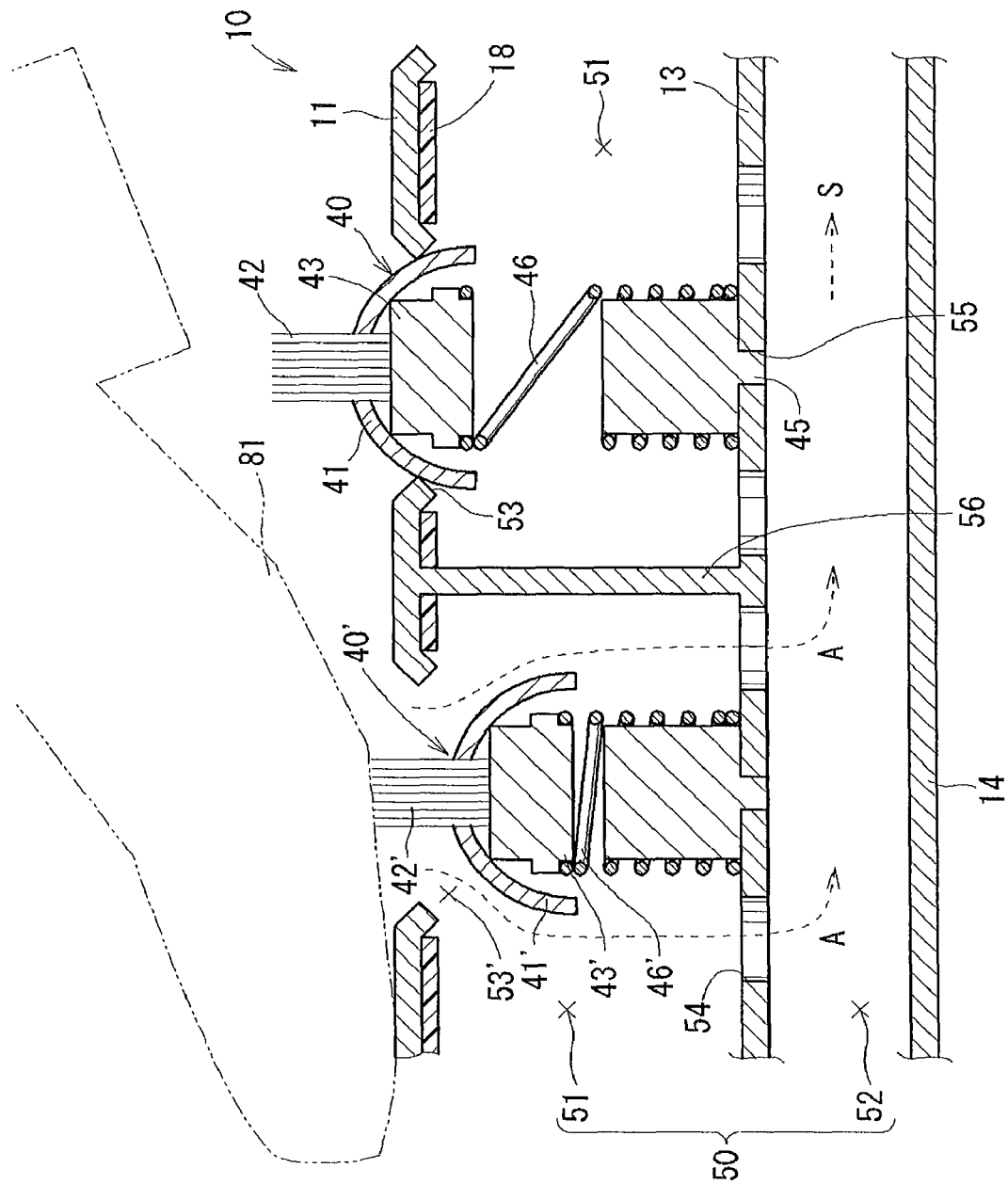
FIG. 5 is a sectional view similar to FIG. 3, showing a second embodiment of the invention.

FIG. 5 shows a housing 10 of a second embodiment. This embodiment is similar to the first embodiment shown in FIGS. 1 to 4, other than the heater 18 provided on the undersurface of the top wall 11. The heater 18 is preferably a sheet-shaped silicon rubber heater, in which a heating resistor (not shown) is, for example, configured to be sandwiched between silicon rubber sheets or the like. The heater 18 is affixed by an adhesive or the like to the undersurface or the back surface of the top wall 11 made of metal such as stainless steel so as to heat the top wall 11. Since the metal-made top wall 11 has good heat conductivity, heating it results in melting snow adhering to a shoe sole 81 lying on the housing 10. As shown in the left side of FIG. 5, when the load applied by the shoe sole 81 makes the movable element 40' in an opened state, the gas flow A formed along the surface of the sealing dome 41' carries water, into which the snow melted by the heater 18, to the gas flow generating unit 20 (see FIG. 1). It should be noted that the snow adhering to the shoe sole 81 can be carried to the gas flow generating unit 20 even in a solid state.

Also, the power supply of the heater 18 mounted on the top wall 11 of the housing 10 can be provided in the unit 20. In this case, the wiring may preferably be provided along the suction tube 30. It should be understood by comparing FIG. 1 with FIG. 5 that the size of the shoe sole 81 against the movable elements 40, 40' comparing to the housing 10 in FIG. 5 is illustrated smaller than actual size, for the purpose of easily understanding the shape of the shoe sole 81.

Third Embodiment

Figure 6:
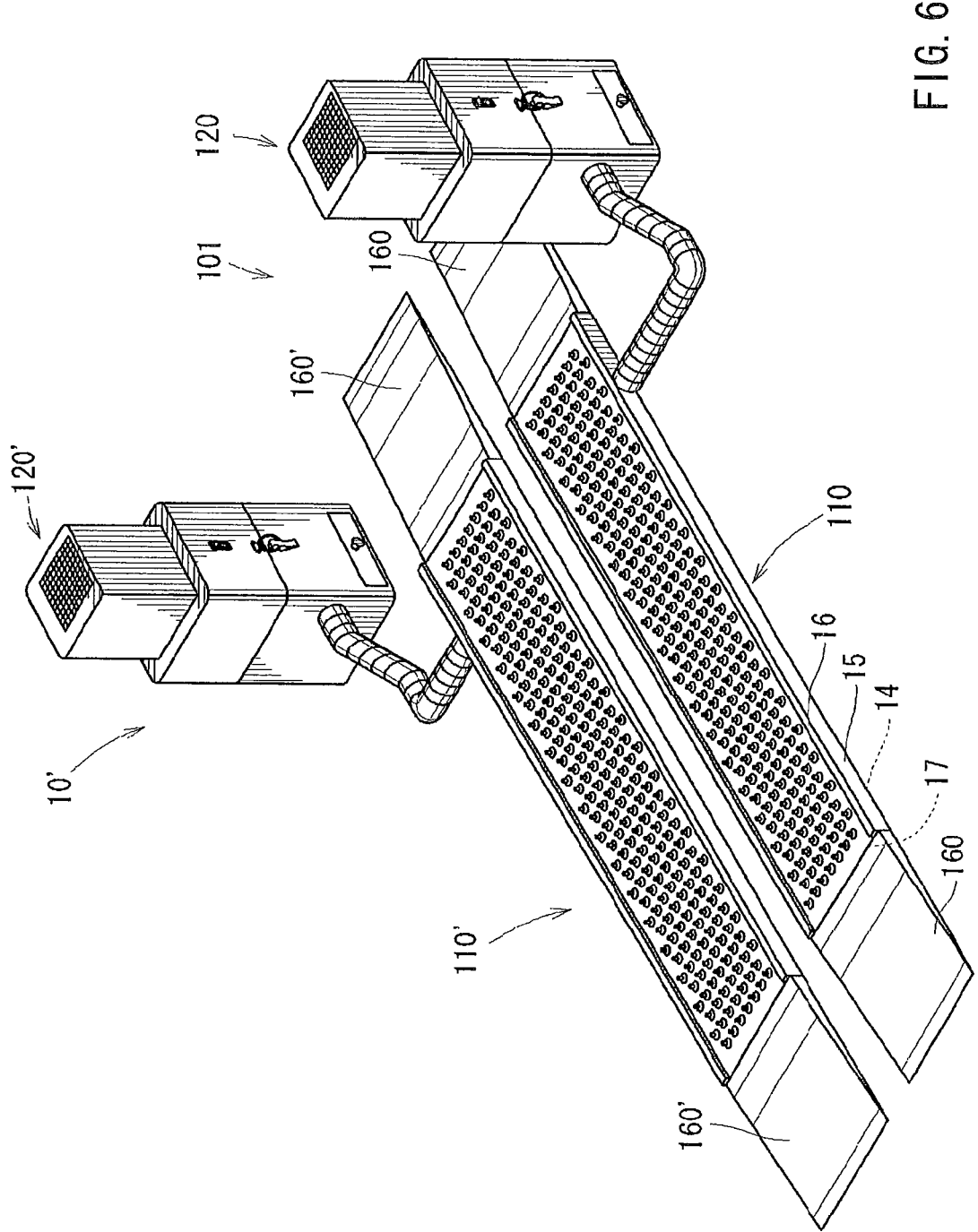
FIG. 6 is a perspective view schematically showing a third embodiment of the invention, which is configured to have two gas flow generating units.

FIG. 6 shows a third embodiment of the present invention. The dust collection systems 1 of the first embodiment shown in FIG. 1 are is similar to the dust collection system 101 of this embodiment. In FIG. 6, 100 is added respectively to the reference numerals of components required for showing the difference from the first embodiment, but the other components that are similar to the first embodiment are referred to as the same reference numerals as shown in FIGS. 1 and 2.

According to the aforementioned structures, when a vehicle such as a forklift passes over housings 110, 110', for example, it is possible to disperse the load of the vehicle between two of the housings 110, 110'. Thus, a load applied onto one housing 110 can be less. Also, it is possible to reduce the transverse length or the width of each of the housings 110, 110'' into approximately half of the housing 10 shown in the first embodiment, while substantially the same inside volume is maintained as of the housing 10 of the first embodiment. Such elongated shape of the housings 110, 110' is suitable for use of a four-wheel vehicle such as a cart, a forklift or the like.

Further, this structure allows the width of the housing 110 to be so small that almost all the load applied onto the housing 110 can be supported by the top wall 11, the side walls 15, the top wall retaining portion 16 and the end caps 17 as long as the profile of the housing 110 is made by a rigid material. Thus, the inner structural materials such as supporting columns, which are required to support the top wall 11 on the basis of the bottom wall 14, are substantially eliminated in the second cavity 52 (see FIGS. 2 and 3). As a result, sufficient gas flow moving within the second cavity 52 can be ensured in the housing 110.

Fourth Embodiment

Figure 7:
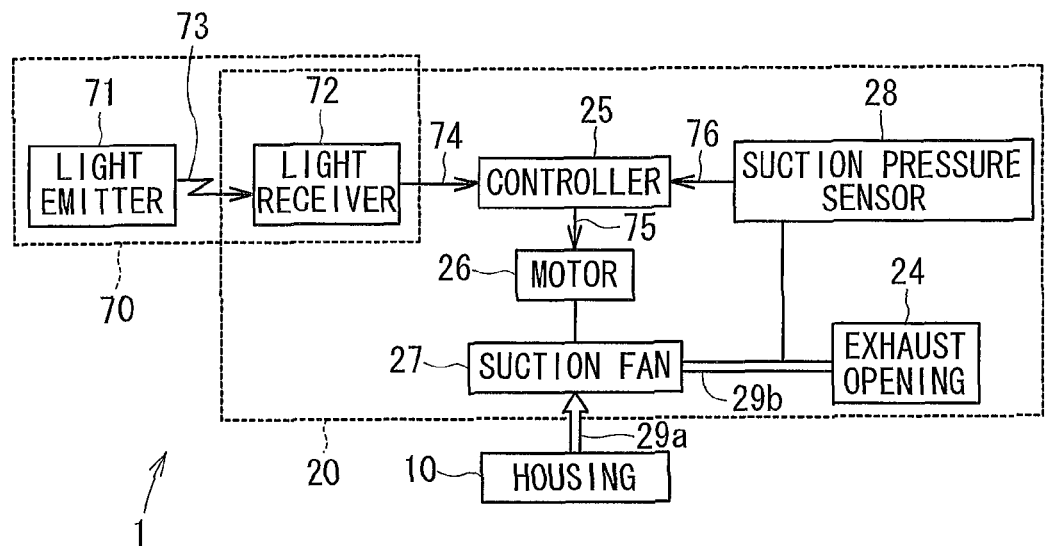
FIG. 7 is a block diagram showing an operational configuration of a fourth embodiment of the invention.

FIG. 7 shows a structure of a fourth embodiment of the present invention as a block diagram. A dust collection system 1 of the fourth embodiment generally includes a housing 10, a gas flow generating unit 20 and an area sensor 70.

In this embodiment, the area sensor 70 controls the on/off of the gas flow generating unit 20 of the first embodiment shown in FIG. 1. Also, the dust collection system 1 of this embodiment further includes a suction pressure sensor 28 for monitoring the exhaust pressure applied by a suction fan 27. The dust collection system 1 has the same components shown in FIG. 1, other than the area sensor 70 and the suction pressure sensor 28 incorporated, but FIG. 7 specifically shows electrical components in the gas flow generating unit 20. It should be noted that hollow arrows originated from the housing 10 and the suction fan 27 are referred to as airflows flowing respectively through exhaust lines 29a and 29b. A portion of the exhaust line 29a extending to the suction fan 27 in the gas flow generating unit 20 from the housing 10 consists of the suction tube 30 shown in FIG. 1.

The area sensor 70 consists of a well-known photoelectronic sensor. The area sensor 70 shown in FIG. 7 is a so-called transmission type sensor, in which a light signal 37 such as visible light or infrared light is emitted from a light emitter 71 and disturbed by a subject such as a person 80 (not shown), and then a variation in the amount of light is detected by a light receiver 72 such that an output signal is obtained. The light emitter 71 is located in any position (not shown) near the housing 10, while the light receiver 72 is located, for example, at a portion (not shown) of the gas flow generating unit 20. However, a so-called reflection type sensor, in which the light emitter 71 and the light receiver 72 are integrally located within the area sensor 70, may be used. In this case, the light signal 73 emitted from the light emitter 71 is reflected by an user 80 so as to be detected by the light receiver 72. It should be noted that the aforementioned reflection type area sensor 70 may be located either in any position (not shown) near the housing 10 or at a portion (not shown) of the gas flow generating unit 20.

As shown in FIG. 7, an electrical output signal 74 obtained from the light receiver 72 is transmitted to a controller 25 via a certain wiring such that the controller 25 controls the rotation of a motor 26. Accordingly, the suction fan 27 mechanically connected with the motor 26 rotates such that the gas flow generating unit 20 is operated. It should be noted that the output signal 74 may be wirelessly transmitted to the controller 25. Thus, the wiring from the area sensor 70 to the controller 25 is advantageously eliminated when the aforementioned reflection type sensor 70, for example, is located in any position (not shown) near the housing 10.

On the other hand, the suction pressure sensor 28, such as an electric pressure sensor is physically mounted at a certain position along the exhaust line 29b extending from the suction fan 27 to the exhaust opening 24. The suction pressure sensor 28 converts pressure within the exhaust line 29b applied by the suction fan 27 into an electrical output signal 76, which is transmitted to the controller 25 via a certain wiring. When the suction fan 27 is in operation, the controller 25 monitors the output signal 76 such that the rpm of the motor 26 can be controlled for the output signal 76 to be maintained at a predetermined level. It should be noted that the rpm control of the motor 26 may be performed by a method such as pulse width modulation control.

According to the aforementioned structures, the dust collection system 1 of the fourth embodiment allows the gas flow generating unit 20 to be operated only when a dust-collected subject, such as a person 80 (see FIG. 1) or a vehicle (not shown), passes over the housing 10. Also, it is possible to maintain the dust collection efficiency of the unit 20 at a predetermined level, regardless of how large the area is that the person 80 or the vehicle occupies on the housing 10 during the passing over the housing 10, because the rpm of the motor 26 can be controlled according to the number of the gas flow inlets 53 (see FIG. 1) in an opened state.

The present invention is not limited to the aforementioned first to fourth embodiments and may cover modifications and variations without departing from the scope of the invention.

For example, instead of the structure in which the top wall 11 supports the partition wall 13 in suspension by the supporting members 56, it is possible to use a structure in which supporting columns provided on the bottom wall 14 support the partition wall 13 from below and then other supporting columns provided on the partition wall 13 support the top wall 11 from below. In this case, the second cavity 52 between the partition wall 13 and the bottom wall 14 is provided with the supporting columns such that the fluid resistance therein may be more increased than in the case that the second cavity 52 is not provided with the supporting columns. As a result, the dust collection efficiency of the gas flow generating unit 20 may be lowered. However, the purpose of this invention that the fluid resistance within the second cavity 52 be controlled can be accomplished, because the number of the supporting columns within the second cavity 52 can be reduced according to the profile and the strength of the housing 10.

Also, the second cavity 52 in the housing 10 may be separated in up and down directions by another partition wall. Providing the further partition wall between the bottom wall 14 and the partition wall 13 allows the further partition wall to support the partition wall 13 from below. In this case, it is preferable that each of the two cavities, which are separated in up and down directions, extending in longitudinal directions is provided with a corresponding gas flow generating unit 20.

Further, the brush 42 abutting on the shoe sole 81 of the person 80 may be substituted by another component having a projection, because the opened state of the gas flow inlet 53 is achieved as long as the sealing dome 41 and the head 43 are displaceable by the load L. Yet further, a component such as the brush 42 provided on the sealing dome 41 may be eliminated. In this case, in order to directly contact the top of the sealing dome 41 with the shoe sole 81, the positional relationship between the sealing dome 41 and the gas flow inlet 53 may adjusted such that the top of the sealing dome 41 protrudes above the top wall 11. Or, the sealing dome 41 may be formed into a triangular pyramid shape, the apex of which is intended to abut on the shoe sole 81.

The invention claimed is:

1. A dust collection system comprising:
    a housing defining a cavity therewithin, the housing including:
        a plurality of inlets and at least one outlet for gas;
        a plurality of movable elements for opening and closing the inlets, the movable elements being respectively provided corresponding to each of the inlets;
        a gas flow generating device for generating a gas flow from each of the inlets to the outlet during the opening operation of the movable elements; and
        a flow path control device for controlling the flow paths of the gas flow;
    wherein the gas flow generating device generates gas flows by introducing the gas outside of the housing from each of the inlets,
    wherein each of the gas flows is controlled by the flow path control device so as to avoid interference from the adjacent movable elements;
    wherein the flow path control device includes a partition wall for separating the cavity within the housing into a first cavity in which the movable elements are disposed, and a second cavity connected to the outlet;
    wherein the partition wall includes a plurality of communicating holes for constantly communicating the first cavity with the second cavity;
    wherein the communicating holes are positioned away from the movable elements; and
    wherein each gas flow moving within the fist cavity is controlled so as to be introduced into the second cavity according to the positioning of the communicating holes.

2. The dust collection system as in claim 1, wherein each of the gas flows that are introduced from each of the inlets flows so as to avoid interference from the adjacent movable elements such that the gas flows are merged by the flow path control device into at least one flow path and then introduced into at least one outlet.

3. The dust collection system as in claim 1, wherein the first and the second cavities are respectively provided in layer such that the second cavity is provided underlying with respect to the first cavity.

4. The dust collection system as in claim 3, wherein the movable elements are constructed and arranged to open some of the plurality of inlets, which are located in an area corresponding to a dust-collected subject passing over the housing; and
    wherein the gas flow generating device is constructed and arranged to introduce the gas outside of the housing via the opened inlets.

5. The dust collection system as in claim 4, wherein the housing further includes a top wall having the plurality of inlets; and
    wherein the top wall is constructed and arranged to hold the partition wall in suspension.

6. The dust collection system as in claim 5, wherein the top wall is provided with a heating member.

7. The dust collection system as in claim 6, wherein the heating member is disposed on the undersurface of the top wall so as to heat the top wall.

8. The dust collection system as in claim 4 further including a suction pressure sensor, wherein the gas flow generating device is controlled based on pressure detected by the suction pressure sensor.

9. The dust collection system as in claim 4 further including an area sensor for sensing an approach of the dust-collected subject, wherein the gas flow generating device is operably controlled according to a signal from the area sensor.

10. A dust collection system comprising:
    a housing defining a cavity therewithin, the housing including a plurality of inlets and at least one outlet for gas;
    a plurality of movable elements for opening and closing the inlets, each of the movable elements being provided corresponding to each of the inlets;
    a partition wall separating the cavity within the housing into a first cavity in which the movable elements are disposed and a second cavity having the outlet, the partition wall further including a plurality of communicating holes for communicating the first cavity with the second cavity, wherein the communicating holes are positioned away from the movable elements; and
    a gas flow generating device for generating an air flow flowing from each of the inlets to the outlet during the opening operation of the movable element;
    wherein the movable element is constructed and arranged to open one of the plurality of inlets, which is disposed within an area corresponding to a dust-collected subject passing over the housing, further wherein the gas flow generated by the gas flow generating device flows in an order of the opened inlet, the first cavity, the communicating hole, the second cavity and the outlet so as to be exhausted out of the housing.

* * * * *